US Patent [19]  
Tinder

[11] 4,429,570  
[45] Feb. 7, 1984

[54] INJECTION TIMING TRANSDUCER
[75] Inventor: David V. Tinder, Dearborn, Mich.
[73] Assignee: Essex Group, Inc., Fort Wayne, Ind.
[21] Appl. No.: 306,049
[22] Filed: Sep. 25, 1981
[51] Int. Cl.$^3$ .................... G01M 15/00; G01L 7/08; F02P 17/00
[52] U.S. Cl. .................................. 73/119 A; 73/730; 73/723; 73/727; 73/756; 310/338
[58] Field of Search ................ 73/119 A, 727, 723, 73/724, 725, 726, 728, 730, 756, DIG. 4; 310/338

[56] References Cited  
U.S. PATENT DOCUMENTS

| | | | |
|---|---|---|---|
| 2,420,148 | 5/1947 | Ostergren | 73/730 X |
| 2,544,567 | 3/1951 | Rindell | 73/726 |
| 2,747,408 | 5/1956 | Boytim et al. | 73/726 |
| 2,848,710 | 8/1958 | Owen | 73/724 X |
| 3,149,492 | 9/1964 | Weinberg | 73/730 X |
| 3,242,449 | 3/1966 | Stedman | 73/726 X |
| 3,625,199 | 12/1971 | Summers | 73/730 X |
| 3,937,087 | 2/1976 | Heggie | 73/119 A X |
| 4,065,969 | 1/1978 | Dinwiddie | 73/730 X |
| 4,130,013 | 12/1978 | Bailey et al. | 73/119 A |
| 4,179,939 | 12/1979 | Price | 73/119 A X |
| 4,190,785 | 2/1980 | Kompanek | 310/338 X |
| 4,193,010 | 3/1980 | Kompanek | 310/330 |
| 4,304,126 | 12/1981 | Yelke | 73/119 A |
| 4,337,650 | 7/1982 | Brandt | 73/119 A |

Primary Examiner—Jerry W. Myracle  
Assistant Examiner—Tom Noland  
Attorney, Agent, or Firm—Stephen A. Schneeberger

[57] ABSTRACT

An injection timing transducer is provided for use with the fuel delivery system of a compression ignition engine. The transducer is operatively associated with the fuel flow path and provides a signal indicative of fuel pressure pulsations within the fuel delivery system. The electrical signals are representative of the derivative or rate of change of fuel pressure as a function of time and are thereby particularly suited for indicating the onset of fuel injection to the engine. The transducer includes a housing member connectable in the fuel flow path intermediate a fuel pump and injector for defining a chamber through which the fuel may pass and for providing a sensor mounting surface external to the chamber but in pressure transmitting relationship with the fluid path. A piezoelectric sensing element is affixed to the sensor mount surface of the transducer housing member. The housing member is typically an elongated, generally tubular member having a central fuel flow path at either end and wherein the chamber is an annular region within the member and radially offset from the central flow path. A continuous flow of fuel through the chamber is provided by radial flow paths between the central flow path and the upstream and downstream ends of that chamber. The annular chamber is conveniently provided by an insert member inserted in radially spaced relation within a central bore in one end of the housing member.

12 Claims, 4 Drawing Figures

INJECTION TIMING TRANSDUCER

DESCRIPTION

1. Technical Field

The invention relates to a transducer and more particularly to an injection timing transducer for use with the fuel delivery system of a compression ignition engine. The transducer of the invention is particularly suited for sensing fuel pressure pulses in a fuel delivery system and providing a corresponding signal indicative of the time of occurrence thereof.

2. Background Art

With the increased development and use of electronic control systems for internal combustion engines, and especially compression ignition or diesel engines, it may be particularly important to provide an accurate indication of the time or timing of the injection of fuel into the engine. At least one existing system provides an electrical signal indicative of the timing of fuel injection by electromagnetically sensing needlelift in the fuel injector. Such a system is prone to noise interference and is relatively complex and expensive.

Various pressure responsive systems are also known for monitoring fuel injection pressure in a diesel engine. One such example is disclosed in U.S. Pat. No. 3,937,087 for Transducer for Engine Fuel Injection Monitoring in which a resistance strain detector is mounted on the circumference of the fuel injection line of a diesel engine to provide an eletrical signal analog of the fuel pressure pulse. That patent alludes to other systems, including those employing pressure responsive crystal transducers, which require breaking into and modifying the fuel delivery system to accommodate the transducers which require direct communion with the fluid. However, the extremely precise nature of a diesel fuel injection system and its sensitivity to system inertia, volume and length of the fluid sonic path tend to make it undesirable to use sensing devices directly in contact with the fluid. Moreover, good dynamic crystal transducers for providing an accurate indication of the fuel pressure pulse are relatively expensive. Thus, such systems have failed to receive general acceptance especially for the purpose of timing fuel injection.

It is therefore an object of the present invention to provide a transducer which accurately indicates the time of injection, or more specifically the onset of injection of fuel to the engine. Moreover, it is an object of the invention to provide such transducer utilizing a relatively inexpensive piezoelectric sensing element which does not require direct contact with the fuel. It is a further object of the present invention that the injection timing transducer be operatively positioned within the fuel delivery system with minimum modification of the fuel delivery dynamics.

In accordance with the invention, there is provided an injection timing transducer for use with the fuel delivery system of a compression ignition engine, which transducer is operatively associated with the fuel flow path and provides a signal indicative of fuel pressure pulsations within the fuel delivery system. The electrical signals are representative of the derivative or rate of change of fuel pressure as a function of time and are thereby particularly suited for indicating the onset of fuel injection to the engine. The transducer includes a housing member connectable in the fuel flow path intermediate a fuel pump and injector for defining a chamber through which the fuel may pass and for providing a sensor mounting surface external to the chamber but in pressure transmitting relationship with the fluid path. A piezoelectric sensing element is affixed to the sensor mount surface of the transducer housing member. The housing member is typically an elongated, generally tubular member having a central fuel flow path at either end thereof and wherein the chamber is an annular region within the member and radially offset from the central flow path. A continuous flow of fuel through the chamber is provided by radial flow paths between the central flow path and the upstream and downstream ends of that chamber. The annular chamber is conveniently provided by an insert member inserted in radially spaced relation within a central bore in one end of the housing member.

BEST MODE FOR CARRYING OUT THE INVENTION

Figure 1:
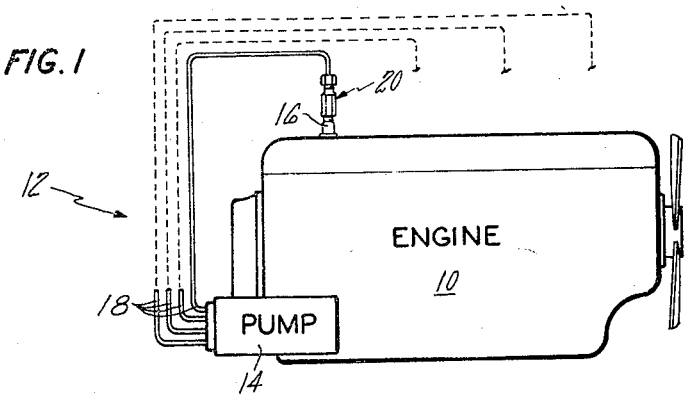
FIG. 1 is a diagrammatic view of a diesel engine illustrating the injection timing transducer of the invention positioned in operative association with the fuel delivery system thereof.

Referring to FIG. 1, there is diagrammatically illustrated a compression ignition or diesel engine 10 including one or more cylinders (not separately illustrated). Associated with engine 10 is a fuel delivery system 12 which typically includes a fuel distribution pump 14, an injector 16 associated with each of the respective cylinders, and a respective fuel conduit 18 extending from the pump 14 to each of the respective injectors 16. Each conduit 18 is typically or relatively small internal diameter and is relatively short to minimize propagation delays in the fuel pressure pulses from the pump to the respective injectors. Moreover, each conduit 18 is normally of the same length from pump 14 to its respective injector 16.

In accordance with the invention, an injection timing transducer 20 is operatively positioned in the fuel flow path from pump 14 to one, two or all of the respective injectors 16. More specifically, a transducer 20 is preferably installed in one or more selected fuel conduits 18 immediately adjacent to the upstream end of the respective injector 16. By positioning the transducer 20 in such proximity with injector 16, its response correlates closely in time with the actual instant of fuel injection by the respective injector. Absent the transducer 20, the fuel conduit 18 would typically be connected to the injector 16 by a threaded nut 22 which axially urges the contoured end 24 of conduit 18 into mating, fluid sealing engagement with the upstream end of the injector. These latter elements may be viewed in greater detail in FIG. 2. The length of conduit 18 may be shortened by the added length of the flow path in transducer 20 to maintain substantially equal total path lengths between the pump and the engine via the several conduits 18.

Figure 2:
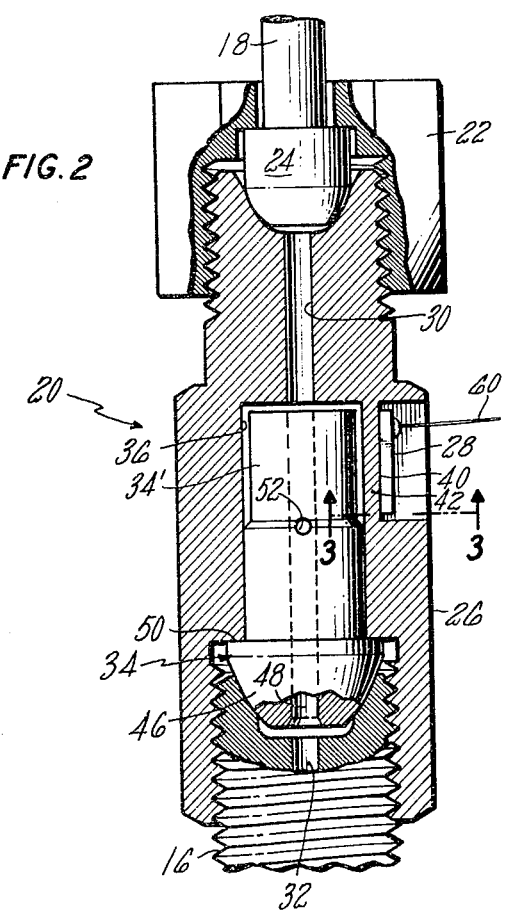
FIG. 2 is a sectional view of the injection timing transducer of the invention.

Referring to FIG. 2, the injection timing transducer 20 is comprised principally of a housing member 26 and a piezoelectric sensing element 28 mounted on the housing member. The housing member 26 is preferably an elongate, generally tubular member of hardened steel or the like, and may be circular or polygonal, i.e. hexagonal, in cross-sectional geometry. An opening, generally designated 30, extends longitudinally through the housing member 26 from one end to the other to provide fluid connection and communication between the fuel delivery path of conduit 18' and the central flow path 32 in the injector 16. The opening 30 is generally coaxial with the member 26 and is of generally circular cross-sectional configuration, as hereinafter described.

An insert member 34 is positioned within a portion of the length of opening 30 and includes a section 34' of its length having an outside diameter which is somewhat less than the diameter of opening 30 thereat, to create an annular chamber 36 within housing member 26. The housing 26 typically has a length of 40-42 mm and is of relatively thick-walled construction, being normally no less than about 2-4 mm thick anywhere along its length. However, a sensor seating or mounting surface 40 is created by boring a radial recess into the outer surface of the member 26 longitudinally adjacent and radially outboard of the chamber 36. The depth of this bore is such that the sensor mounting surface 40 is separated from the chamber 34 by a thin-walled section 42 of the housing member which is less than 1 mm in thickness, and typically is 0.8 mm or less. This thin-walled portion 42 undergoes a small mechanical displacement in response to pressure pulsations in the fuel and thus transmits those forces from chamber 36 to the sensing element 28.

The opening 30 has a small diameter, i.e. 1.7 mm, at the upstream end of the housing 26. However, the diameter of opening 30 is radially enlarged into the annular chamber 36 downstream in order that the sensor mounting surface 40, and thus also the sensing element 28, may have a relatively large surface area in close, pressure responsive relation with a relatively large area of the chamber via housing wall 42.

Although the radially inner surface of housing wall 42 might have been created simply by a large-volume circular opening in housing 26, that relatively large volume of fuel would introduce undesirable propagation delays and distortions to the fuel transport dynamics. Accordingly, the cross-sectional area of annular chamber 36 is maintained relatively small, having an inner diameter of about 7.3 mm and an outer diameter of about 7.5 mm. As previously mentioned, this annular chamber 36 is most conveniently provided by the installation of a separate insert member 34, however, it will be appreciated that chamber 36 need not be an annulus, nor does the housing member require an insert if the requisite fluid passages can as suitably be provided in another manner. To configure the housing 26 such that it may receive insert 34, a first relatively large coaxial bore extends about one-third the length of the housing from its downstream end and a second coaxial bore of lesser diameter extends over the middle third of the housing member. The large downstream bore is threaded for threaded engagement with the upstream end of injector 16. The insert 34 is a rod-like or cylindrical pin having a generally hemispherical head 46 at its downstream or proximal end, which head is of slightly larger diameter than its shaft. The diameter of the insert shaft immediately adjacent to the head 46 is substantially the same as the inside diameter of the bore in the midregion of the housing member 26 for close fitting insertion thereinto. The remaining portion 34' at the distal end of the shaft of insert 34 is of decreased outside diameter to provide the annular chamber 36 hereinbefore described. An axial bore 48 through the center of insert 34 and of substantially the same diameter as the diameter of opening 30 in the upstream portion of housing 26 affords one path for fluid communication between the upstream and downstream ends of the housing 26.

The radially enlarged head 46 of insert 34 provides an axially upstream facing shoulder or flange 50 which coacts with the downstream-facing surface of housing 26 at the transition between the largest and intermediate size bores therein to limit the insertion of insert 34 within housing 26. The length of the insert 34 is such that its upstream or distal end is spaced a small distance, i.e. 0.1-0.2 mm, from the downstream-facing transition surface between the annular chamber 36 and the small diameter upstream opening 30 in housing member 26. This spacing places the annular chamber 36 in fluid communication with the opening 30 toward the upstream end of the housing member 26. A small bore 52, typically having a diameter of about 1 mm, extends at least radially from the central bore 48 in insert 34 to the outer surface thereof and preferably extends through the full diameter of the insert shaft. The longitudinal positioning of bore 52 on the shaft of insert 34 is at, or slightly upstream of, the transition in shaft diameters. This location ensures fluid communication of the bore 52 with the annular chamber 36 to provide a return path for fuel flow from the annular chamber to the center bore 48 in the insert 34, for subsequent discharge downstream. Thus, a continuous flow of fuel is permitted through annular chamber 36 and the total fuel-filled volume in that region of housing 26 is not so great as to seriously affect the transport dynamics of the system otherwise existing without the inclusion of transducer 20.

The larger diameter portion of the shaft of insert 34 is preferably coated with a suitable sealant for ensuring a fluid-tight seal between it and housing 26 when inserted therein. The upsteam end of injector 16 is contoured for circular line engagement with the head 46 of insert 34 and applies an axial seating force thereto and to the limit flange 50 when the injector is threaded into housing 26. The insert 34 is preferably of a softer metal than injector 16, as for instance unhardened steel, such that its head 46 may deform sufficiently when engaged by the upper end of injector 16 to provide a fluid-tight seal with the injector. The contour of the upstream end of housing 26 is similar to that of the injector for similar sealed engagement with conduit end 24.

Figure 3:
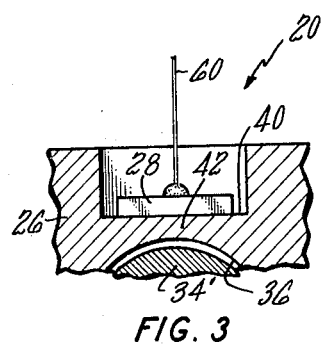
FIG. 3 is an enlarged, partial sectional view of the transducer of FIG. 2 taken along lines 3—3 thereof.

Referring to FIG. 3, a partial transverse section of the transducer 20 taken through the pressure transmitting wall 42 of the housing 26 reveals that wall to be relatively thin and of relatively uniform thickness. It will be observed and appreciated that some variation in thickness does occur in wall 42 between its midregion and its end regions because the sensor mounting surface 40 is flat whereas the outer wall of chamber 36 is arcuate. However, such variation in thickness is relatively minor and the slightly thinner middle section of wall 42 amply transmits the fluid pressure pulsations from chamber 36 to the piezoelectric sensor 28.

The piezoelectric sensor 28 is preferably a ceramic disk of lead zirconate titanate or like material, which is relatively inexpensive and durable. The sensor 28 is bonded to the mounting surface 40 with a suitable adhesive. The adhesive may be electrically conductive or in a preferred embodiment, may be noncondutive with sufficient electrical contact being established therethrough by the surface roughness of the sensor and the mounting surface. A suitable electrical lead, represented by conductor 60, is conductively bonded to the upper surface of the piezoelectric element 28 near its perimeter. The electrical output of piezoelectric element 28 is provided to appropriate circuitry via conductor 60 and via a conductive path from the undersurface of the sensor to the housing 26 and through the injector 16 and engine 10.

Figure 4:
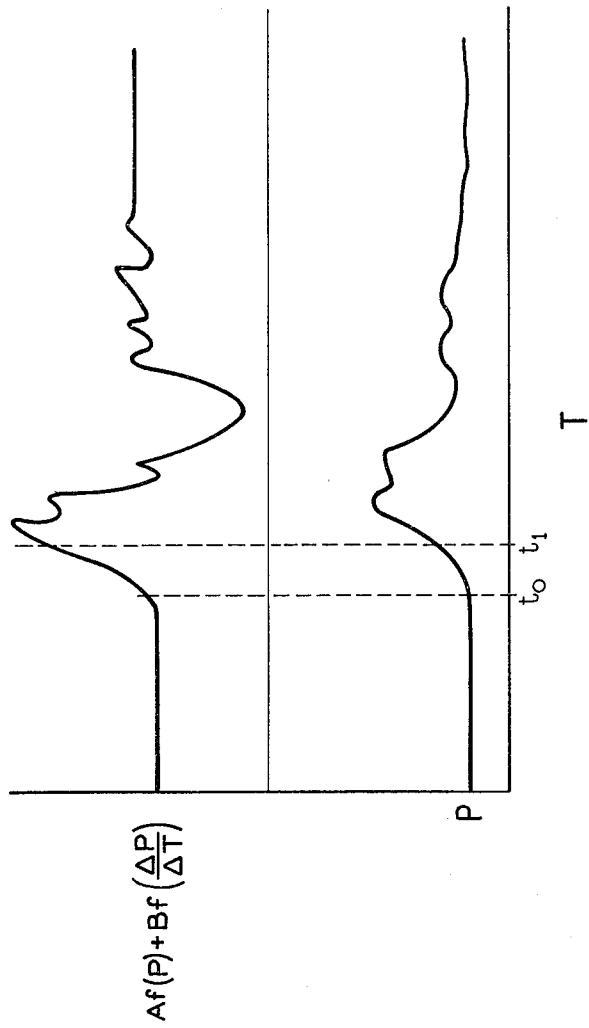
FIG. 4 is a graphical plot of the fuel pressure and of an electrical signal representing the derivative or rate of change thereof.

Referring now to FIG. 4, there is illustrated a graphical plot of the fuel pressure, P, as a function of time in the fuel delivery system at the location of transducer 20 and a graphical plot of the electrical signal provided by piezoelectric element 28, which signal is representative of the derivative of fuel pressure as a function of time, $\Delta P/\Delta t$. The pressure of the fuel in the fuel delivery system experiences a pulse-like increase which leads to the opening of injector 16 whereupon the fuel is discharged into the engine. The fuel pressure then decreases to a steady state condition. The beginning of this increase in pressure is indicated by $t_0$ on the graphs of FIG. 4 in which the initiation of actual injection of fuel from the injector to the engine is approximately represented by time $t_1$. The fuel pressure wave form, P, will vary somewhat as a function of speed and its amplitude may vary as a function of associated noise and as a function of the type of sensor employed. Such possible variations in the shape and amplitude of the fuel pressure signal make the utilization of that specific signal unreliable in attempting to repeatedly and accurately indicate the onset of fuel injection. On the other hand, the electrical output of piezoelectric sensor 28 is a signal voltage which is a function of not only the fuel pressure P, but also of the derivative of fuel pressure as a function of time, i.e. $\Delta P/\Delta t$. The relative magnitudes of the two components, i.e. $Af(P)$ and $Bf(\Delta P/\Delta t)$ of the signal is a function of the electrical load impedance, with the $\Delta P/\Delta t$ component increasing relative to the P component as the impedance decreases. This signal undergoes an abrupt and significant rise as the slope of the pressure signal P begins to increase. Accordingly, it will be appreciated that the magnitude of this signal experiences a sharp increase in the brief interval from $t_0$ to $t_1$ such that it may conveniently be utilized to indicate with repeatable accuracy, the start of injection in the short interval between $t_0$ and $t_1$. Typically, the interval of $t_0 - t_1$ is 0.3 ms or less and the signal responds to provide a positive and unambiguous indication within that interval. The output of piezoelectric sensor 28 may then be provided, via conductor 60, as the input to signal processing load circuitry which recognizes the steep wave front of the signal as indicating the start of fuel injection.

Although this invention has been shown and described with respect to detailed embodiments thereof, it will be understood by those skilled in the art that various changes in form and detail thereof may be made without departing from the spirit and scope of the claimed invention.

I claim:

1. An injection timing transducer for use with the fuel delivery system of a compression ignition engine, said fuel delivery system supplying pressurized pulses of fuel from pumping means to injecting means for injection into the engine via a fuel flow path, the transducer comprising:

a housing member insertable in the fuel flow path in sealed relation therewith, said housing member including a bore extending longitudinally therethrough in flow registry with said flow path for maintaining continuity of said flow path, said bore being of a first diameter for one portion of its length and being of a relatively larger second diameter along a second portion of its length longitudinally adjacent to and downstream of said one portion, said bore including a chamber in fluid communication with said flow path, a section of said member being sufficiently thin-walled adjacent to said chamber therein for transmitting pressure pulsations in the fuel therethrough to a relatively external sensor mount position;

an insert member positioned within part of said second portion of the length of said bore in said housing member, said insert member including an outside diameter intermediate said first and said second diameters of the housing member bore to define a substantially annular portion of said bore including said chamber; and sensing means mounted on said housing member at said sensor mount position for sensing said pressure pulsations and for providing electrical signals indicative thereof.

2. The transducer of claim 1 wherein said sensor mount position of said housing member undergoes mechanical displacement in response to the pressure pulsations in the fuel and said sensing means is connected to said mount position such that said mechanical displacement thereof is applied to said sensing means.

3. The transducer of claim 2 wherein said sensing means is a piezoelectric material.

4. The transducer of claim 2 wherein said sensing means is a piezoelectric ceramic disk adhesively bonded to said mount position.

5. The injection timing transducer of claim 4 wherein said piezoelectric ceramic disk is comprised of lead zirconate titanate.

6. The transducer of claim 1 wherein said mounting position comprises a seating surface inwardly recessed in the exterior of said housing member.

7. The transducer of claim 6 wherein said thin wall of said housing member separating said chamber and said seating surface is of relatively uniform thickness and is less than about 1.0 mm.

8. The transducer of claim 1 wherein said housing member is elongate, substantially tubular, and of relatively thick-wall construction, and said bore extends longitudinally therethrough near the centerline thereof for said one portion of its length and relatively nearer the periphery thereof for said second portion thereof which includes said chamber.

9. The transducer of claim 1 wherein said bore is of a third diameter greater than said second diameter along a third portion of its length longitudinally adjacent to said second portion thereby to create an insert seating surface at the transition therebetween, and said insert member includes a limit flange extending transversely outward therefrom for longitudinal engagement with said insert seating surface to limit the insertion of said insert member.

10. The transducer of claim 9 wherein the proximal end of said insert member is contoured and positioned for axial engagement with part of the fuel delivery system to which said housing member is connectable, thereby to maintain said inset member limit flange in said seated engagement with the insert seating surface of said housing member.

11. The transducer of claim 1 wherein said insert member includes an axial bore in at least the downstream end thereof and including passage means for conducting fuel from said housing bore radially outward to the upstream end of said chamber and radially inward to said insert axial bore from the downstream end of said chamber to ensure continuous flow through said chamber.

12. The transducer of claim 11 wherein said axial bore in said insert member extends therethrough, and at least part of the distal end of said insert member is axially spaced from said housing member to provide said passage means for said radially outward flow to said annular chamber, and said passage means for said radially inward flow comprising at least one opening extending substantially radially in said insert member from said annular chamber to said insert axial bore.

* * * * *